United States Patent [19]
Piret

[11] Patent Number: 5,867,508
[45] Date of Patent: Feb. 2, 1999

[54] METHOD AND DEVICE FOR THE CORRECTION OF ERRORS IN THE TRANSMISSION OF SERIES OF INFORMATION ITEMS

[75] Inventor: Philippe Piret, Cesson-Sevigne, France

[73] Assignee: Canon Kabushiki Kaisha, Tokyo, Japan

[21] Appl. No.: 840,820

[22] Filed: Apr. 16, 1997

[30] Foreign Application Priority Data

Apr. 17, 1996 [FR] France ................................. 9604794

[51] Int. Cl.$^6$ ................................. H03M 13/00
[52] U.S. Cl. ................................. 371/37.01
[58] Field of Search ................................. 371/37.01

[56] References Cited

U.S. PATENT DOCUMENTS

| 4,468,770 | 8/1984 | Metcalf et al. | 371/42 |
| 5,131,012 | 7/1992 | Dravida | 375/108 |

FOREIGN PATENT DOCUMENTS

0609595 10/1994 European Pat. Off. .
0660533  6/1995 European Pat. Off. .

OTHER PUBLICATIONS

Levitin et al., "A New Approach to the General Minimum Distance Decoding Problem: The Zero–Neighbors Algorithm", IEEE Transactions on Information Theory, vol. IT–31, No. 3, May 1985, pp. 378–384.

Primary Examiner—Stephen M. Baker
Attorney, Agent, or Firm—Fitzpatrick, Cella, Harper & Scinto

[57] ABSTRACT

According to the invention, for the transmission of sequences of information items referred to as "code words", among which sequences referred to as "operative words" are selected, on reception of a signal representing received words, each formed from a sequence of numbers having one of at least three values, and representing a code word, the following are implemented: a function of combining two sequences, one of which is an operative word, the said combination providing a so-called "resultant" sequence; a measurement whereby there is made to correspond to each sequence a real number representing the degree of coherence of the sequence; and, for each word received; at least one sequence resulting from the said received word and from an operative word is calculated iteratively and the said received word is replaced by the said resultant sequence from the moment when the measurement of the degree of coherence of the latter indicates a coherence less than that of the received word, this resultant sequence being referred to as a "replacement sequence", until no new combination of the last replacement sequence with any operative word exhibits a degree of coherence whose measurement is less than that of the said last replacement sequence,; the said last replacement sequence then being considered as representing the difference between the word received and the code word which it represents.

19 Claims, 5 Drawing Sheets

METHOD AND DEVICE FOR THE CORRECTION OF ERRORS IN THE TRANSMISSION OF SERIES OF INFORMATION ITEMS

The present invention concerns a method and device for detecting and correcting any errors in the transmission of a series of information items modulating a periodic signal.

The present invention applied particularly to the correction of any errors in radio transmissions between two systems equipped with antennae for respectively the transmission and reception of electromagnetic waves and having respectively means for modulating and demodulating radio signals.

Any transfer of information between two devices can include transmission errors, that is to say unintentional modifications to the transmitted signal. These errors and the number thereof depend on the transmission medium, that is to say on the channel allowing an item of information to pass from one point to another. This medium can be conventional, used in telecommunications or in the storage of information, using an optical, magnetic, paper etc. medium.

With known information transfers, when a sequence is received representing the information items and containing transmission errors, it is necessary to have available an effective method which is simple to apply for estimating what the transmitted sequence was by analysing the sequence received. One well-known method consists of comparing the received sequence with all the transmittable sequences and of selecting as an estimation the transmittable sequence which most closely resembles the sequence received. This approach is, however, relatively long and complex as the number of comparisons to be carried out is necessarily large.

In the case of the use of a linear code based on the alphabet {0,1}, Levitin and Hartmann ("A new approach to the general minimum distance decoding problem: the ZN algorithm" published in May 1985 by the journal IEEE Trans. On Inform. Theory, IT-31, pages 378 to 384) described a simpler method which uses the comparison, if necessary repeated, only with a sub-set of transmittable words, also called code words. This method is, however, described only for the binary alphabet. Furthermore, it does not take into account the fact that the reliability of the symbols received can be variable.

The present invention intends to remedy these drawbacks in the case of an amplitude, frequency or phase modulation of a periodic signal. A method of correcting errors has been researched which increases the chances of correctly estimating the information received.

The inventor has also attempted to develop a method for using code words which is easy to implement in an electronic device and which operates very quickly.

According to a first aspect the present invention proposes to this effect a method for transmitting series of information items which takes into consideration the following:

sequences of numbers referred to as "code words", each of said numbers having one of at least three values;
among the code words, sequences referred to as "operative words";

this method consisting of performing the following operations for each series of information items to be transmitted:
said series of information items to be transmitted is represented by a series of code words referred to as a "series for transmission" in accordance with a biunique correlation rule;
a periodic signal is successively modulated by the numbers of the code words of the series for transmission and the signal thus modulated is transmitted;
when this signal is received, it is demodulated into a series of words referred to as "received words", each formed from a sequence of numbers and representing a code word;

characterised in that the following are additionally implemented:

a function of combining two sequences, one of which is an operative word, the said combination providing a so-called "resultant" sequence;
a measurement whereby there is made to correspond to each sequence a real number representing the degree of coherence of the said sequence;

and in that, for each word received:
at least one sequence is calculated resulting from a combination of said received word and an operative word and
the said received word is replaced by the said resultant sequence from the moment when the measurement of the degree of coherence of the latter indicates a coherence less than that of the received word, this resultant sequence being referred to as a "replacement sequence";

and iteratively:
at least one sequence is calculated resulting from the combination of the replacement sequence and an operative word and
the replacement sequence is replaced by the said resultant sequence from the moment when the measurement of the degree of coherence of the latter indicates a coherence less than that of the preceding replacement sequence, this resultant sequence in turn being considered as "replacement sequence";

this iterative calculation being repeated until no new combination of the last replacement sequence with any operative word exhibits a degree of coherence whose said measurement is less than that of the said last replacement sequence; the said last replacement sequence then being considered as representing the difference between the word received and the code word which it represents.

According to a second aspect, the invention proposes a method for receiving messages modulating a periodic signal consisting, on reception of this signal, of demodulating it into a series of received words, each formed from a sequence of numbers and representing a sequence of numbers referred to as a "code word", each number of said code word having one of at least three values;

characterised in that the following are additionally implemented:

a function of combining two sequences, one of which is an operative word selected from the code words, the said combination providing a so-called "resultant" series;
a measurement whereby a real number, representing the degree of coherence of the sequence, is made to correspond to each sequence;

and in that, for each word received:
at least one sequence is calculated resulting from a combination of said received word and an operative word and
the said received word is replaced by the said resultant sequence from the moment when the measurement of the degree of coherence of the latter indicates a coherence less than that of the received word, this resultant sequence being referred to as a "replacement sequence";

and iteratively:

at least one sequence is calculated resulting from the combination of the replacement sequence and an operative word and the replacement sequence is replaced by the said resultant sequence from the moment when the measurement of the degree of coherence of the latter indicates a coherence less than that of the preceding replacement sequence, this resultant sequence in turn being considered as "replacement sequence";

this iterative calculation being repeated until no new combination of the last replacement sequence with any operative word exhibits a degree of coherence whose said measurement is less than that of the said last replacement sequence; the said last replacement sequence being then considered as representing the difference between the received word and the code word which it represents.

According to a third aspect the invention proposes a message which takes into consideration the following:

sequences of numbers referred to as "code words", each of said numbers having one of at least three values;

among the code words, sequences referred to as "operative words";

this method consisting of performing the following operations for each series of information items to be transmitted:

the series of information items to be transmitted is represented by a series of code words referred to as a "series for transmission" in accordance with a biunique correlation rule;

a periodic signal is successively modulated by the numbers of the code words of the series for transmission and the signal thus modulated is transmitted;

characterised in that the code words are adapted so that the difference between the word received after demodulation of this signal and the code word which it represents corresponds to the last replacement sequence of a succession of steps implementing:

a function of combining two sequences, one of which is an operative word, the said combination providing a so-called "resultant" sequence;

a measurement whereby there is made to correspond to each sequence a real number representing the degree of coherence of the said sequence;

steps by means of which:

at least one sequence is calculated resulting from a combination of the said received word and an operative word and the said received word is replaced by the said resultant sequence from the moment when the measurement of the degree of coherence of the latter indicates a coherence less than that of the received word, this last resultant sequence being referred to as a "replacement sequence";

and iteratively:

at least one sequence is calculated resulting from the combination of the replacement sequence and an operative word and the replacement sequence is replaced by the said resultant sequence from the moment when the measurement of the degree of coherence of the latter indicates a coherence less than that of the preceding replacement sequence, this last resultant sequence being in turn considered as "replacement sequence";

this iterative calculation being repeated until no new combination of the last replacement sequence with any operative word exhibits a degree of coherence whose measurement is less than that of the said last replacement sequence.

By virtue of these arrangements the method according to the invention overcomes the drawbacks outlined above. This method of estimating the series of numbers transmitted is simple and enables a correction device according to the invention to determine any error in the transmission of these numbers and to correct it.

According to a preferred aspect of the invention, the function of combining two sequences, one of which is an operative word, takes into consideration a predetermined number and provides a "resultant" sequence, each element of the resultant sequence being the addition, modulo said predetermined number, of the elements having the same rank in the combined sequences as said element of the resultant sequence.

By virtue of these arrangements each combination of words is particularly simple.

According to a preferred aspect of the invention, the modulation acts upon the phase of the periodic signal and the last replacement sequence is considered as being equal to a sequence of phase differences between the signals corresponding to the received word and those corresponding to the transmitted code word which they represent.

By virtue of these arrangements the estimation of each word transmitted is particularly simple.

According to another preferred aspect of the invention the code words form a closed set, all their combinations, by means of the said combination function, being code words.

By virtue of these arrangements, starting with a few given code words, all the code words for which the invention can be applied are used.

According to another aspect of the invention the operative words are selected in such a way that the measurement of their degree of coherence is among the least significant of all the code words.

According to another aspect of the invention, the code words are selected in the form of sequences of numbers, in which the circular shifts of the elements, which maintain their order modulo the number of elements, are also code words.

According to another aspect of the invention the operative words are selected in the form of sequences in which the circular shifts of the elements, which maintain their order modulo the number of elements, are also operative words.

By virtue of these arrangements the code words are easy to determine and to generate in a communication device.

According to another aspect of the invention the code words are sequences of pairs representing a modulus and an argument of a complex number, the operative words have a modulus equal to 1, and the combination function is the function which multiplies the moduli and adds the arguments, modulo $2\pi$.

According to another aspect of the invention the code words are sequences of arguments of complex numbers and the combination function adds the arguments.

According to another aspect of the invention the code words are sequences of signal amplitude and phase pairs and the measurement of the degree of coherence of each sequence is the opposite of the sum of the products, for all the signals making up the said sequence, of the amplitude multiplied by the cosine of the phase.

According to another aspect of the invention the iterative calculation is halted from the moment when the measurement of the degree of coherence of the last replacement sequence is below a threshold value.

By virtue of these arrangements it is not necessary to effect all the possible combinations of the last replacement sequence as, simply by measuring its degree of coherence and comparing this degree with a threshold value, it is determined whether it is necessary to continue with the iterations.

According to another aspect of the invention the correlation rules include a permanent correlation between the numbers of the sequence to be transmitted and the code words.

By virtue of these arrangements, a number is correlated with a code word by the simple reading, at an address representing the number, of a random access memory or read-only memory.

The invention also relates to a device for receiving series of information items having:
- a means of demodulating received signals into a series of a <<received words>>, each formed from a sequence of numbers and representing a <<code word>> formed from a sequence of numbers, each number of said code word having one of at least three values;
- a random access memory which stores the series of received words;
- a memory which stores the operative words, each formed from a code word;

characterised in that it also has:
- a first comparison random access memory which initially stores the first word in the series of received words;
- a second comparison random access memory which initially stores an operative word;
- a means for combining the words stored in the comparison random access memories, the said combination providing a so-called "resultant" word formed from a series of numbers;
- a measurement means, whereby a real number, representing the degree of coherence of the sequence, is made to correspond to each received or combined word;
- a comparison means for transmitting an item of information representing the word with the lowest degree of coherence between the word stored in the first comparison random access memory and the resultant word;
- a replacement means which, if the word with the lowest coherence is the word stored in the first comparison random access memory, replaces this word with the combined word, and if not replaces the word stored in the second comparison random access memory with another operative word;

the combination means, the measurement means, the comparison means and the replacement means being used iteratively until, for each word received, the degree of coherence of the word stored in the first comparison random access memory is less than the measurements of all the degrees of coherence of the combined words arising from the combination of this word and an operative word;

the last word stored in the first comparison random access memory then being considered as representing the difference between the received word and the code word which it represents.

According to another aspect, the device according to the invention has a means of comparing the measurement of the degree of coherence of the word stored in the first comparison random access memory on the one hand and with a threshold value on the other hand, and when the first element is lower than the second, the word stored in the first comparison random access memory is considered as representing the difference between the received word and the code word which it represents.

The invention also relates to a device for transmitting series of information items intended to be processed by a device for receiving series of information items as briefly described above, characterised in that it includes:
- a means of generating code words formed from sequences of numbers, each of said numbers having one of at least three values;
- a means of correlating the series of information terms to be transmitted with a series of code words referred to as a "series for transmission", according to a biunique correlation rule, which it supplies to the generation means;
- a means of modulating a periodic signal by means of the numbers of the code words of the series for transmission coming from the generation means;
- a means of transmitting the signal thus modulated.

According to another aspect, this device has a correlation table which correlates on a permanent basis the numbers of the series to be transmitted with the code words.

The invention finally relates to a communication system which has transmission means and/or reception means such as those briefly disclosed above.

The advantages of these devices are the same as those of the methods which they implement and which are disclosed above. They are therefore not mentioned again here.

Other aims, characteristics and advantages of the invention will emerge from a reading of the description which follows, written with reference to the accompanying drawings, in which.

Figure 1:
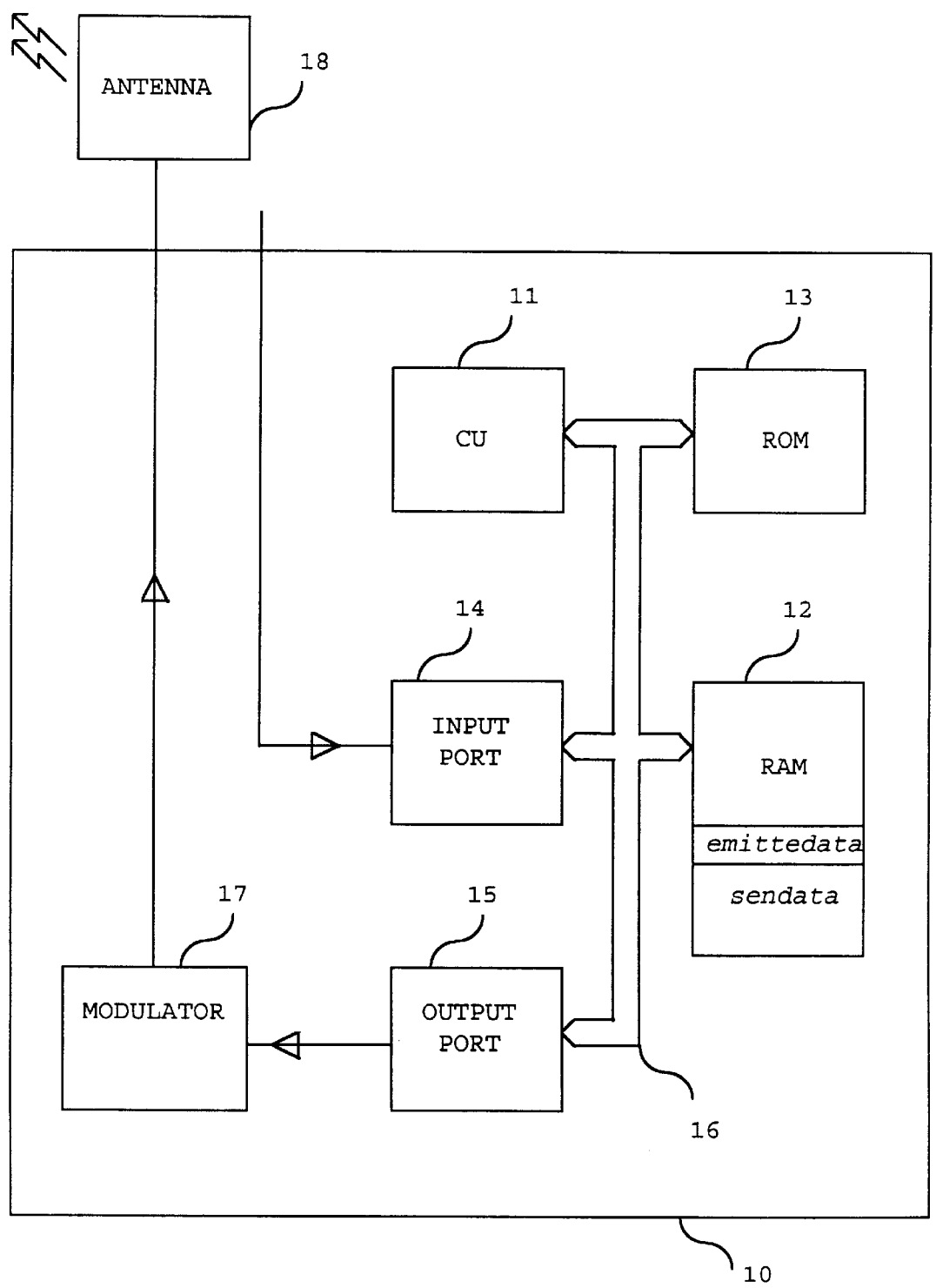
FIG. 1 is a schematic view in block form of a transmitter according to the present invention.

In the particular embodiment presented with reference to the figures, the signal representing transmitted numbers is phase modulated. It should, however, be noted that the invention is not limited to phase modulation but can also be applied to amplitude modulation, frequency modulation or to phase quadrature modulation and that the implementation of these different types of modulation is within the capability of communications experts.

Throughout the description the following terms are used:
series "for transmission": the series of numeric, symbolic and/or alphabetic information which is to be transmitted remotely;

"code words": certain sequences of seven integer numbers between zero and seven inclusive. These code words are in fact the alphabet which is used;

"initial transmitted" series: the series of code words which represent the series to be transmitted and which modulate the phase of a periodic signal;

"initial received" series: the series of groups of seven pairs of phase and amplitude values of the signal received, which is demodulated on receipt of the initial transmitted series;

"sequences" of series having a structure which characterises them;

"code words" of the sequences of numbers;

"operative words": certain code words;

"combination function": a function which associates, with an operative word and a sequence of seven pairs of numbers, a new sequence of seven pairs of numbers referred to as a "resultant sequence";

"measurement of the degree of coherence of a sequence": a numeric function which associates a single numeric value with a sequence of seven pairs of numbers.

In the description hereinafter the situation is described in which eight different signals can be transmitted on one transmission channel between a time O taken as the time origin and a timer T. Naturally the invention is not limited to the phase modulation of eight phases but can cover all the values of the number of phases used.

The sequences used for transmission are septuples of pairs. The figure n sometimes used in the description thus corresponds, in this particular embodiment, to the value seven. The pairs correspond to signals which can take the form of eight sine waves of amplitude standardised to unity having exactly the same frequency but also having eight phases separated at regular intervals. These signals are each expressed by:

$$\mathrm{Sin}(\omega t + \phi + v.\pi/4) \text{ with t between O and T} \qquad (1)$$

a formula in which $f = \omega/2\pi$ is the frequency of the carriers;

$\phi$ is an arbitrary but fixed phase; and $v$ is a number between 0 and 7 inclusive, representing an item of information to be transmitted or transmitted in the period of time ranging from O to T. Thus, in order to transmit an initial transmitted sequence composed of the seven coded symbols $V_i$, where i is the number of the information transmitted, the corresponding signal is $$\mathrm{Sin}(\omega t + \phi + v_i.\pi/4) \text{ for t between i.T and (i+1).T} \qquad (2)$$

This information transmission system is, in a known manner, referred to as "phase modulation with eight modulated phases".

Without limiting the generality of the proposal but for the purpose of providing explanation, it will be assumed in the following that $\phi$ is zero, which amounts to assuming that the time origin is selected for this purpose.

Through demodulation, the signal received is estimated as being:

$$g_i \mathrm{Sin}(\omega t + (v_i + e_i).\pi/4) \text{ for t between i.T and (i+1).T} \qquad (3)$$

instead of the ideal value identical to the transmitted signal. The amplitude, $g_i$, can be different from unity and $e_i$, the phase error, can be different from zero, as a result of the noise on the transmission channel.

Figure 3:
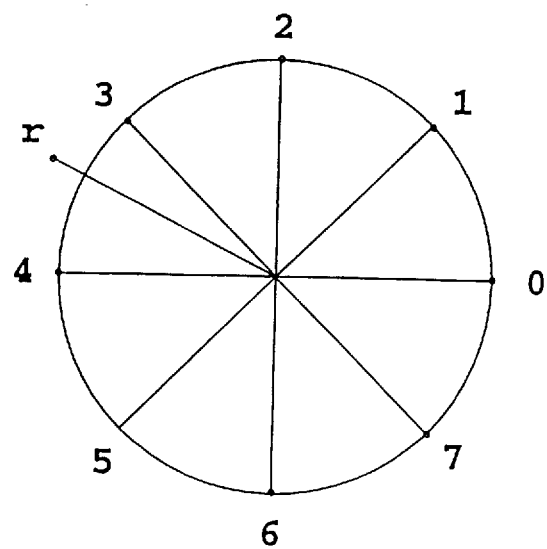
FIG. 3 is a depiction, in one plane, of signals able to assume eight values, and the depiction of a received signal, in an example embodiment of the present invention.

The depiction in FIG. 3 is associated with the signals of the type presented above. In this figure the eight complex values associated with the eight possible phases of the transmitted signal, eight different phases spaced at regular intervals, and a complex number r, associated with a received signal, are shown on a circle. It will be noted that the received signal has an amplitude and phase different from those of the transmitted signals.

Given that a transmitter transmits a series of signals representing, by means of their phase value, the transmitted initial series, that is to say a series of integer values between zero and seven, inclusive, a receiver receives a series of signals which can each be associated with a phase value $v_i + e_i$. By effecting $$s_i = V_i + e_i \qquad (4)$$

a sequence of seven received signals is represented by a septuple $$[(s_0, g_0); (s_1, g_1); (s_2, g_2); (s_3, g_3); (s_4, g_4); (s_5, g_5); (s_6, g_6)], \qquad (5)$$

the transmitted signals being, according to the same representation, an n-uple $$[(v_0, 1); (v_1, 1); (v_2, 1); (v_3, 1); (v_4, 1); (v_5, 1); (v_6, 1)]. \qquad (6)$$

In general, according to the present invention, any data stream including binary information, any symbols, letters, numbers, for example, is associated, by means of a coding operation of any kin, here for example by means of a biunique correlation table, with a series of code words.

In the embodiment described n has been made equal to seven and, as a result, each code word is composed of a sequence of seven pairs of integer values, the second of the values of each pair being equal to unity. These integer values lie between zero and seven inclusive and the code words exhibit the characteristics described below. In the remainder of the description the method will, for the purpose of providing explanation, be followed on a single septuple of signal phase and amplitude pairs, the processing of each of the septuples corresponding to the received signals being identical to an independent of that of the other septuples.

This septuple $(v_0, 1); (v_1, 1); (v_2, 1); (v_3, 1); (v_4, 1); (v_5, 1); (v_6, 1)$ is in fact transmitted by a modulation of the phase of a periodic signal in accordance with known techniques.

During an error correction operation the decoder tries to carry out an estimation of the initial septuple received which is correct, that is to say equal to an initial septuple effectively transmitted, before obtaining encoded information by carrying out a decoding operation which is the opposite operation to that of coding using the correlation table.

A function of combining two sequences is selected, the second of which is such that the second element of each pair is unity. In the example selected and depicted, the combination function adds, modulo eight, the first elements of the pairs of equal rank in the sequences and multiplies the second elements of the pairs of equal rank. With $$S = [(s_0, g_0); (s_1, g_1); (s_2, g_2); (s_3, g_3); (s_4, g_4); (s_5, g_5); (s_6, g_6)] \qquad (7)$$

$$V = [(v_0, 1); (v_1, 1); \ldots ; (v_6, 1)] \qquad (8)$$

the combination function "@" associates $$S@V = [(s_0 + v_0, g_0); (s_1 + v_1, g_1); (s_2 + v_2, g_2); \ldots ; (s_6 + v_6, g_6)] \qquad (9)$$

where each addition designated "+" and acting on the terms representing phases, is effected modulo eight.

This function of combining two sequences of seven pairs of numeric values provides a new so-called "resultant" sequence of seven pairs of numeric values.

The method according to the invention will first be described.

The coding method:

The processing is carried out on the set of septuples of pairs whose first elements are integer numbers between zero and seven and whose second elements are still equal to unity. The operations on the septuples are known, the coefficient resulting from the operations being reduced modulo eight, that is to say being replaced by the integer remainder of the division by eight.

The code words used here have the property of forming a closed set for the combination function @: when S and V are code words, S@V is also a code word. It is known that a closed set can be specified by matrices, or tables of numbers, having k rows and n columns (with n greater than k). In the present case, n=7. Such a table will, in the remainder of the description, be designated G.

The information to be coded is represented by a k-uple $$a=(a_0,a_1,a_2,a_3,\ldots,a_{k-1}) \qquad (10)$$

of elements $a_i$ of the set $\{0,1,2,3,4,5,6,7\}$ and it is coded in an n-uple which is designated for convenience as a@G and which is obtained as follows. The septuple of pairs forming the $i^{th}$ line of G is first denoted $g^{(i)}$.

Knowing the $i^{th}$ symbol $a_i$ of the k-uple of information a, the n-uple $$a_i g^{(i)} = g^{(i)} @ g^{(i)} @ g^{(i)} @ \ldots @ g^{(i)} \qquad (11)$$

is constructed by applying the combination function @ iteratively in such a way that, in the latter expression, $g^{(i)}$ appears $a_i$ times. If $a_i \neq 0$, $a_i g^{(i)}$ designates the septuple, all elements of which are pairs whose first element is zero and the second is unity: (0,1).

The coded word a@G is thus defined by $(a_0 g^{(0)})@(a_1 g^{(1)}) @(a_2 g^{(2)})@(a_3 g^{(3)})@ \ldots @(a_{k-1} g^{(k-1)})$, it is a word of length n, here a septuple, represented by $$V=[(v_0,1); (v_1,1); \ldots ; (v_6,1)] \qquad (12)$$

It should be noted that this general manner of specifying code words is well known to persons skilled in the art. It should also be noted that if all the elements of $g^{(i)}$ are even, $a_i$ can take its values only from the set $\{0,1,2,3\}$, and that if all the elements of $g^{(i)}$ are multiples of four, then $a_i$ can take its values only from the set $\{0,1\}$.

Finally it should be noted that where the set of code words is cyclic, considerably simplifications are introduced.

The second part of the coding consists of making a sequence of sinusoidal signals whose amplitudes are equal and whose phases are, expressed in radians, successive products of the values $v_0, v_1, v_2, v_3, v_4, v_5$ and $v_6$ multiplied by a quarter of $\pi$, correspond to the septuple $$V=[(v_0,1); (v_1,1); \ldots ; (v_6,1)] \qquad (13)$$

In the example selected and depicted, the correlation rules have a permanent correlation between the integer numbers of the sequence to be transmitted and the code words.

The error correction method:

Each septuple of pairs, each consisting of a phase and amplitude of the transmitted signal, is associated with the reception of another septuple of pairs consisting of the successive phases and amplitudes of the signals received. This is because the signals received by the demodulator at the output of the receiving antenna are of the type:

$$R_i = g_i \cdot \operatorname{Sin}((\omega t + (V_i + e_i) \cdot \pi/4) \qquad (14)$$

A measurement of a degree of coherence of each septuple is selected. In the example selected and depicted, this measurement of the degree of coherence is equal to the opposite of the sum of the products of each amplitude multiplied by the cosine of the product of the phase in question multiplied by a quarter of $\pi$.

Thus the measurement of the degree of coherence is defined as the numeric function which associates with the set R of the $R_i$ values, for the index i ranging from 0 to 6 inclusive:

$$g(R) = \Sigma_{(i=0;i=6)} g_i \cdot \cos(v_i + e_i) \cdot \pi/4); \qquad (15)$$

Then, sequences of numbers referred to as "operative words" are selected from among the code words in such a way that:

their measurement of the degree of coherence is among the lowest of all the code words;

if the set of code words is cyclic, the circular shifts of the operative words which maintain their order, modulo the number of elements, are also operative words.

The following is a practical way of determining the operative words. On the basis of the characteristics of the code, a list of septuples E=[($e_0$,1); ... ; ($e_6$,1)] is established with $e_i$ in the set $\{0,1,2,3,4,5,6,7\}$ for each i. This list is called a "list of error corrections". It represents the list of errors which have been selected for correction but is limited to those errors E whose components $e_i$ are in the set $\{0,1,2,3,4,5,6,7\}$ and where the second elements of each pair are equal to unity.

This list is limited by the characteristics of the code but it can be shorter than the maximum list corresponding to the code used. In the latter case it is possible for the error correction to be simpler but also less effective. For each code word V different to the word $[(0,1); (0,1); \ldots ; (0,1); (0,1)]$ and for each word E representing an error of the type described above which is to be corrected, the word U=V@E is constructed. On the one hand the first list of words obtained in this way is defined. On the other hand, the list of code words different to the word $[(0,1); (0,1); \ldots ; (0,1); (0,1)]$ and which have a minimum degree of coherence is established. It is this second list which will be extended to form the list of operative words. In fact, this second list will be extended in the following manner.

The word from the first list which has the lowest degree-of-coherence value is successively taken from the words of the first list which have not yet been processed. Let U=V@E be this word. If no combination function @ combining this word U and a word of the second list generates a word, the measurement of whose degree of coherence is lower than that of U, then the code word V used to construct U=V@E is added to the list of operative words.

It should be noted that, if the code is cyclic, the code words obtained by means of the circular shifts of the elements of the word in question which preserve, modulo the number of elements, the order of the elements, are also to be added to the list of operative words.

Recurrently, by successively testing all the words in the first list in ascending order of their degree of coherence, the list of all the operative words is determined.

It will be observed that the said list of operative words is constructed on the basis of a first list containing only the words U=[($u_0, g_0$); ... ; ($u_6, g_6$)] in which the first elements of each pair are elements of $\{1,2,3,4,5,6,7\}$ and in which the second elements of each pair are equal to unity. This does not prevent it from being used to correct errors on the septuples of pairs received which do not satisfy these conditions.

Starting with the initial series received, in the error correction method according to one aspect of the invention, for each word received, consisting of a sequence of numbers and representing a code word:

at least one sequence is calculated resulting from the combination of the said received word and an operative word and the said received word is replaced by the said resultant sequence from the moment when the measurement of the degree of coherence of the latter is less than that of the received word, this last resultant sequence being referred to as a "replacement sequence";

and iteratively:

at least one sequence is calculated resulting from the combination of the replacement sequence and an operative word and the replacement sequence is replaced by the said resultant sequence from the moment when the measurement of the degree of coherence of the latter is less than that of the preceding replacement sequence, this last resultant sequence being in turn considered as "replacement sequence";

this iterative calculation being repeated until no new combination of the last replacement sequence with any operative word exhibits a degree of coherence whose said measurement is less than that of the said last replacement sequence;

The said last replacement sequence is then considered as representing the difference between the word received and the code word which it represents and the transmitted code word is deduced therefrom.

It should be noted that the last replacement sequence is considered as being equal to a sequence of phase differences between the signal representing the word received and the signal representing the code word which it represents.

By way of example, the code specified by the matrix with three rows and seven columns will be considered $$G = \begin{matrix}(1.1)(5.1)(7.1)(2.1)(1.1)(0.1)(0.1)\\(0.1)(1.1)(5.1)(7.1)(2.1)(1.1)(0.1)\\(0.1)(0.1)(1.1)(5.1)(7.1)(2.1)(1.1)\end{matrix} \quad (16)$$

Let us select as a set of operative words the following four words $$G = \begin{matrix}[(1.1);(5.1);(7.1);(2.1);(1.1);(0.1);(0.1)]\\ [(5.1);(2.1);(0.1);(1.1);(7.1);(1.1);(0.1)]\\ [(2.1);(1.1);(1.1);(5.1);(0.1);(7.1);(0.1)]\\ [(2.1);(2.1);(7.1);(1.1);(1.1);(2.1);(1.1)]\end{matrix} \quad (17)$$

and these same words multiplied by seven, as described above, modulo eight, and the seven circular shifts of the eight words thus obtained, shifts which maintain, modulo seven, the order of the pairs.

In this way a set of operative words of fifty six elements is obtained from five hundred and twelve code words. It can also be verified that these are indeed the operative words obtained by the method disclosed above, for the code specified by the matrix G, that is to say all the linear combinations of the rows of this matrix.

Let us take as a total received series that which corresponds to a signal having successively the following values:

R0=0.8.sin($\omega t$+(6.5).$\pi$/4) R1=1.1.sin($\omega t$+(0.8).$\pi$/4) R2=1.2.sin($\omega t$+(0.9).$\pi$/4) R3=0.7.sin($\omega t$+(1.3).$\pi$/4) R4=0.5.sin($\omega t$+(5.9).$\pi$/4) R5=1.0.sin($\omega t$+(3.1).$\pi$/4) R6=1.1.sin($\omega t$+(7.8).$\pi$/4) (18)

This series can be expressed by the septuple of phase and amplitude pairs:

[(6.5; 0.8); (0.8; 1.1); (0.9; 1.2); 1.3; 0.7); (5.9; 0.5); (3.1; 1.0); (7.8; 1.1)]

The measurement of the degree of coherence of this series is: −2.76. It can easily be seen that by combining @ with the operative word

[(3.1); (6.1); (0.1); (7.1); (1.1); (7.1); (0.1)]

a resultant sequence is obtained equal to

[(1.5; 0.8); (6.8; 1.1); (0.9; 1.2); (0.3; 0.7); (6.9; 0.5); (2.1; 1.0); (7.8; 1.1)]

the measurement of whose degree of coherence is −3.88 and which thus becomes the replacement sequence. By means of the function @ of combination of the so-called "preceding" resultant sequence

[(1.5; 0.8); (6.8; 1.1); (0.9; 1.2); (0.3; 0.7); (6.9; 0.5); (2.1; 1.0); (7.8; 1.1)]

with the septuple

[(7.1); (1.1); (7.1); (0.1); (3.1); (6.1); (0.1)].

the resultant sequence

[(0.5; 0.8); (7.8; 1.1); (7.9; 1.2); (0.3; 0.7); (1.9; 0.5); (0.1; 1.0); (7.8; 1.1)]

is obtained, which has a measurement of the degree of coherence of −5.83. This sequence thus becomes the new replacement sequence. By trying all the operative words it is seen that none of them makes it possible to create, with the preceding resultant sequence

[(0.5; 0.8); (7.8; 1.1); (7.9; 1.2); (0.3; 0.7); (1.9; 0.5); (0.1; 1.0); (7.8; 1.1)]

a new resultant sequence, the measurement of whose degree of coherence is lower than −5.83.

The word received

[(6.5; 0.8); (0.8; 1.1); (0.9; 1.2); (1.3; 0.7); (5.9; 0.5); (3.1; 1.0); (7.8; 1.1)]

is therefore considered to be the combination by means of the function @ of combining the transmitted code word which is to be determined and the last replacement sequence

[(0.5; 0.8); (7.8; 1.1); (7.9; 1.2); (0.3; 0.7); (1.9; 0.5); (0.1; 1.0); (7.8; 1.1)].

By using the inverse combination of the combination "@", that is to say that which associates the first member of this combination with the result of the combination @ and the second member of this combination, the transmitted code word

[(6.1; (1.1); (1.1); (1.1); (4.1); (3.1); (0.1)]

is obtained.

DESCRIPTION OF THE DEVICES IMPLEMENTING THE PRESENT INVENTION

An embodiment of the devices implementing the present invention will now be described with reference to FIGS. 1 to 5. The coding device is presented in the form of a block diagram and depicted under the general reference 10 (FIG. 10). It includes, connected together by an address and data bus 16;

a central processing unit 11;
a random access memory 12;
a read-only memory 13;
an input port 14 serving to receive the information which the coding device is to transmit;
an output port 15 enabling the device to transmit the initial transmitted series;

and, independently of the bus 16:

a modulator 17 of the phase of a periodic signal by means of the numbers which it receives through the output port 15;
a transmitting antenna 18 which transmits radio waves.

The random access memory 12 has notably a register sendata in which the so-called series "for transmission" is stored, optionally representing numbers, characters and/or symbols. The random access memory 12 also has registers storing groups of variables described below.

The read-only memory 13 is adapted for storing the operating program of the central processing unit 11 and the correlation table correlating the symbols of the series for transmission with septuples of integer numbers between zero and seven inclusive, forming code words. The central processing unit 11 is adapted to implement the flow diagram described in FIG. 4.

Figure 2:
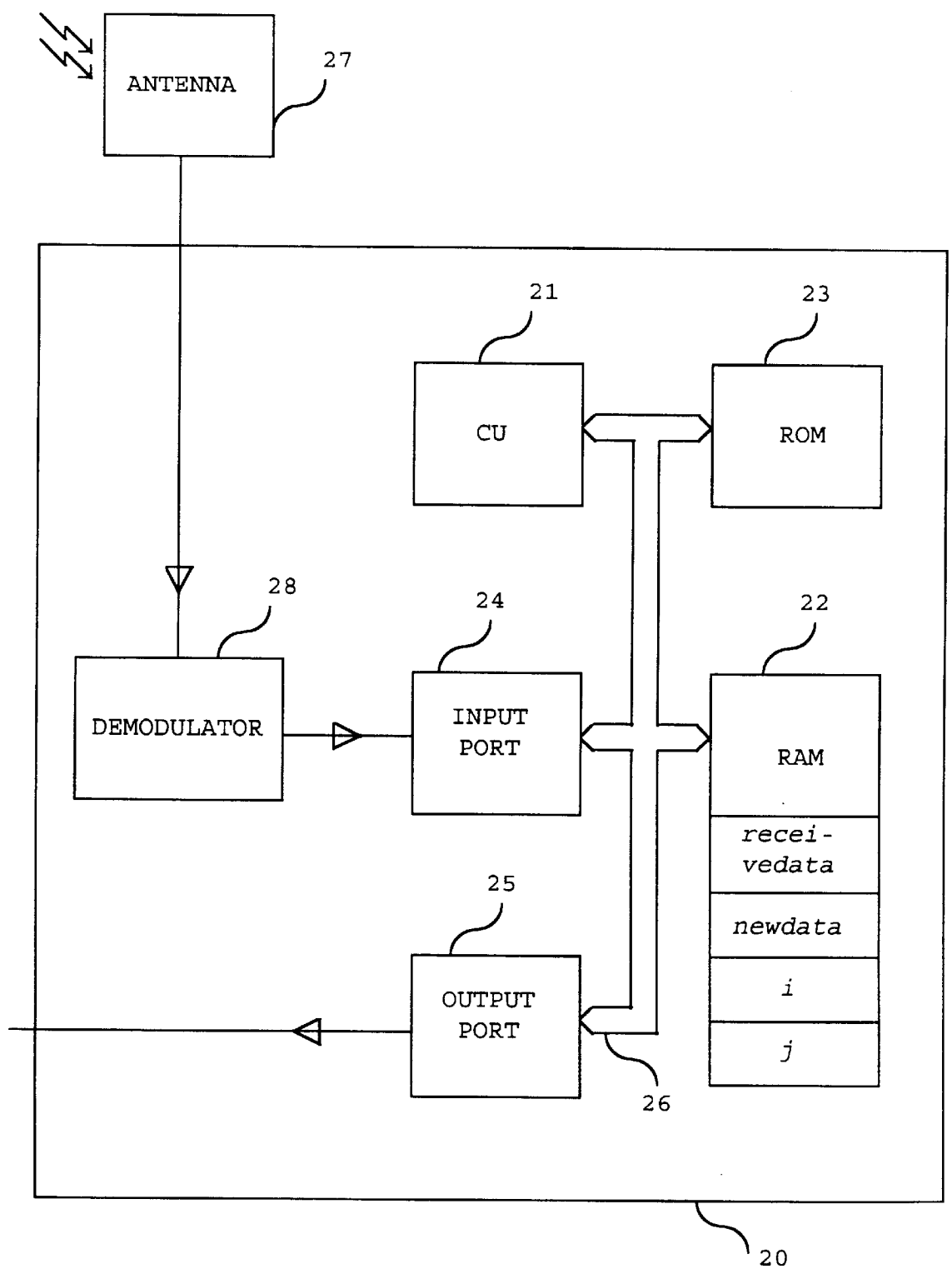
FIG. 2 is a schematic view in block form of a receiver having an error correction device according to the invention.

The error correction device depicted in FIG. 2 is illustrated in the form of a block diagram and is depicted under the general reference 20. It has:

a receiving antenna 27 which receives radio waves and transmits, in a certain predetermined wavelength band, these radio waves to a demodulator 28;

the demodulator 28 of the phase of a periodic signal which transmits the demodulated numbers to an input port 24; and, connected together by an address and data bus 26:

a central processing unit 21;

a random access memory 22;

a read-only memory 23;

an output port 25 enabling the device to transmit the decoded data, the input port 24 serving to receive the information to be decoded coming from the demodulator.

The random access memory 22 has notably a register receivedata in which is stored the so-called initial received series representing the initial transmitted series after its phase modulation, its transmission, reception and demodulation. This series is composed of septuples of pairs, whose first elements are decimal numbers between zero, inclusive, and eight, exclusive, and whose second elements are positive real numbers or zeros. The random access memory 22 also has registers storing groups of variables described below.

The read-only memory 23 is adapted to store the operating program of the central processing unit 21 and the operative words taken from the code words present in the read-only memory 23, as indicated above. The central processing unit 21 is adapted to implement the flow diagram described in FIG. 5. This configuration is known to data-processing systems experts and is therefore not described more precisely here.

Figure 4:
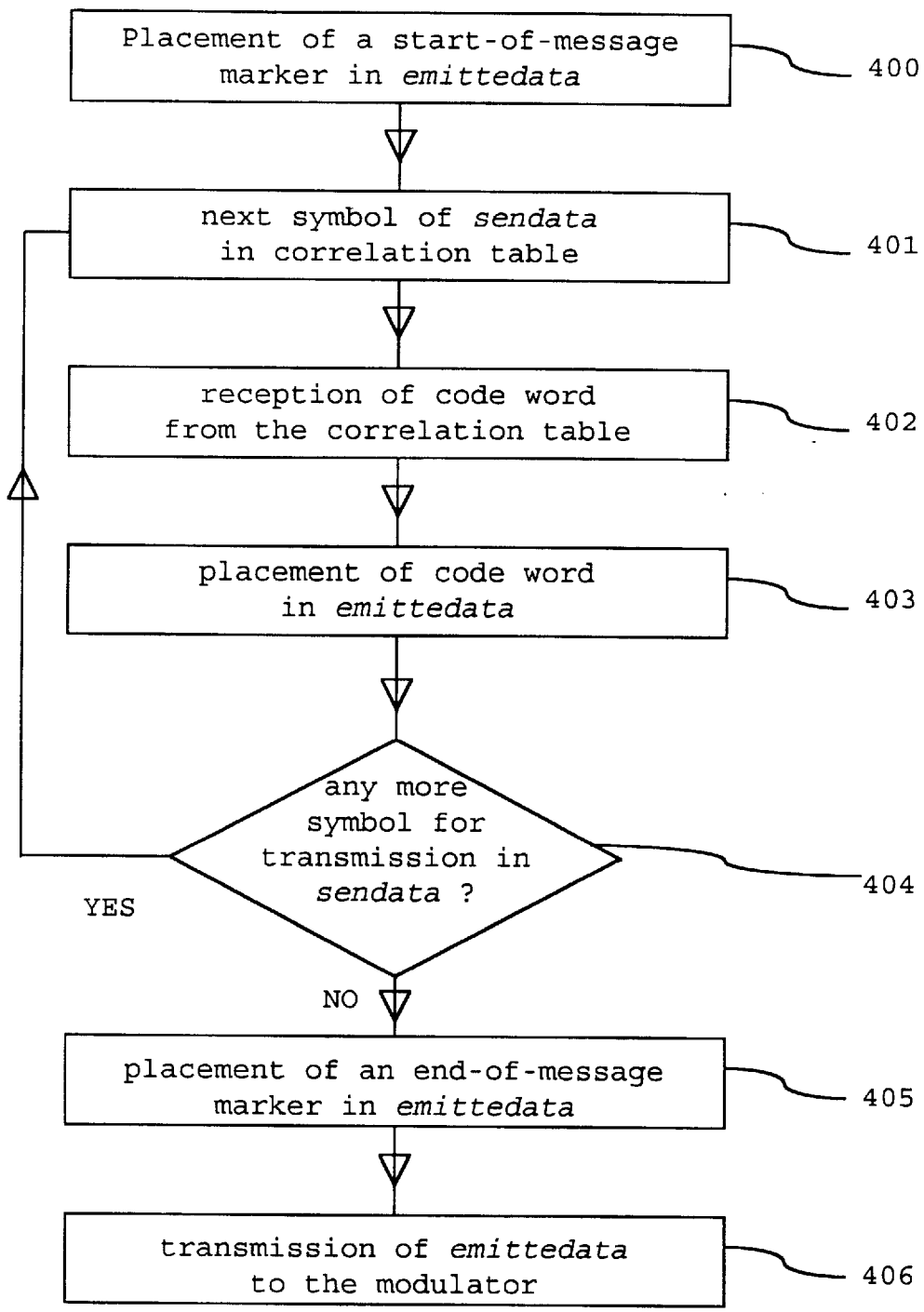
FIG. 4 is a flow diagram of a program for coding the numbers making up the series to be transmitted.

FIG. 4 gives details of a flow diagram of a program for coding the series to be transmitted into an initial transmitted series according to the method briefly described above.

During the operation 400 the central processing unit 11 places in a register emittedata of the random access memory 12 a start-of-message marker, a marker consisting of a code word.

During the operation 401, the central processing unit 11 takes from the resister sendata of the random access memory 12 the next symbol (that is to say the elementary quantity of the information) of the series to be transmitted and sends it to the correlation table in the read-only memory 13.

During the operation 402 the correlation table sends to the central processing unit 11 a septuple representing a code word, itself representing the symbol to be transmitted.

During the operation 403 the central processing unit 11 puts this code word in the register emittedata of the random access memory 12.

During the test 404 the central processing unit tests whether there are any symbols for transmission remaining in the register sendata of the random access memory 222. If the test is positive, the central processing unit 11 returns to the operation 401. If the test is negative the operation 405 puts in memory, in the register emittedata, an end marker taken from the code words. The operations 401 to 404 constitute the so-called phase "for coding" the series to be transmitted into an initial transmitted series.

The operation 406, finally, consists of transmitting the total transmitted series by transmitting, in the order in which it was stored in the register emittedata, the information present therein, to the modulator 17, via the output port 15. The modulator 17 then modulates the phase of a periodic signal by the numbers coming out of the register emittedata, maintaining the amplitude of this signal at a constant value, and transmits the modulated signal to the transmitting antenna 18.

Figure 5:
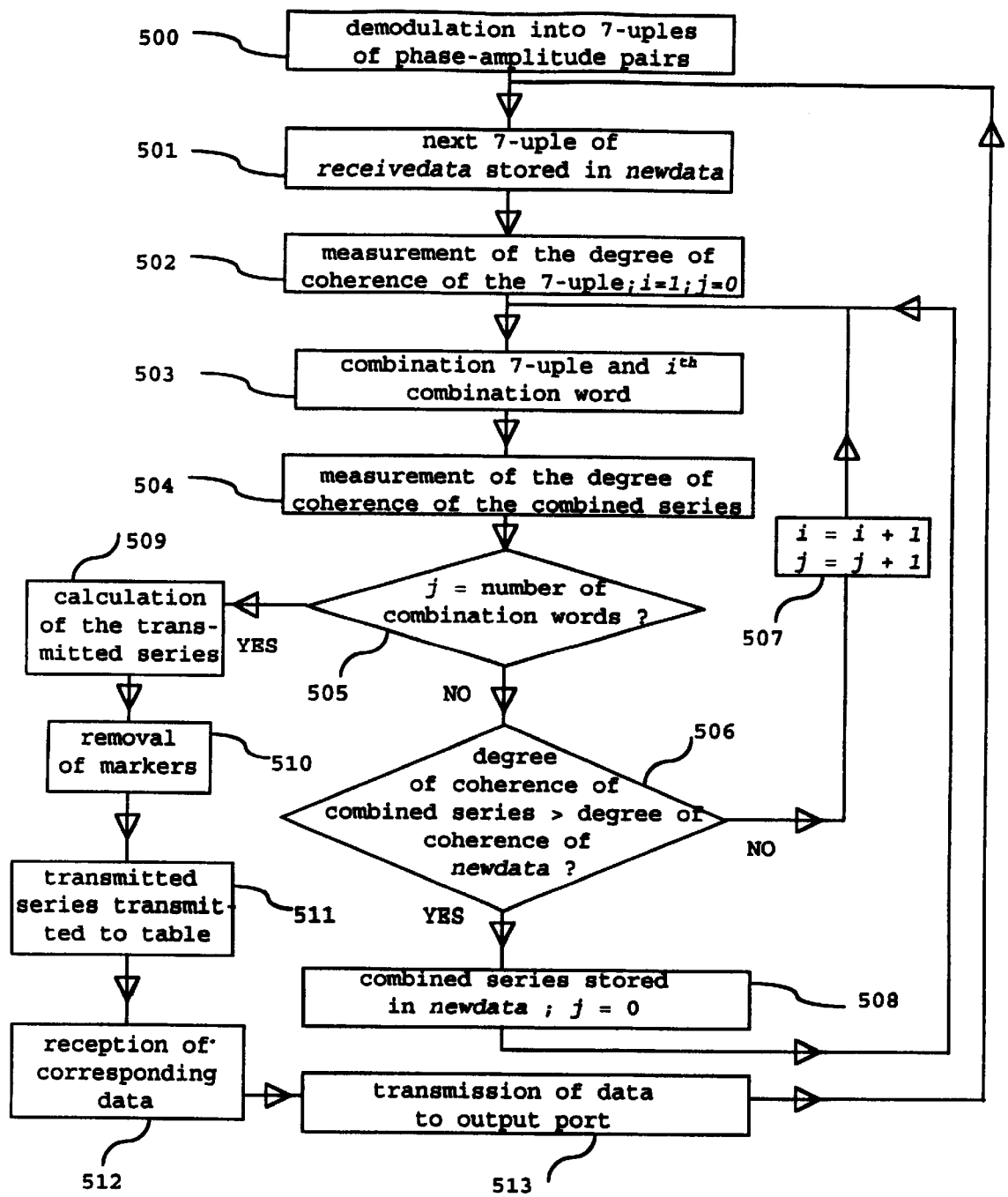
FIG. 5 depicts the flow diagram of the program for correcting errors.

Following a so-called "transmission" phase consisting, apart from the operation 406, of the radio transmission of the modulated periodic signal, the transmission of the radio wave proper, its reception by the antenna 27 and the demodulation of the phase by the demodulator 28, the numbers of the initial transmitted series are received in the form of a so-called "received" initial series of amplitude-phase pairs by the error correction device depicted in FIG. 2 and processed according to the method of the invention in line with the flow diagram depicted in FIG. 5, during a so-called "error correction" phase during which possible so-called "transmission" errors are sought.

In the embodiment describeed here, a received septuple of pairs of elements, one of which represents one of the successive phases of the received signal and the other one of which represents the amplitude corresponding to the phase in question, corresponds to each septuple of pairs or code word transmitted.

These series of septuples of pairs of decimal numbers of the initial received series are automatically placed in the register receivedata of the random access memory 22, in the order in which they are received, that is to say in the order of the symbols represented by this initial received series. This constitutes the operation 500.

The operation 501 consists, for the central processing unit 21, of extracting the next septuple of pairs of decimal numbers from the register receivedata and placing it in a register called newdata in the random access memory 22. If no septuple is available, the central processing unit 21 waits for a new one from the demodulator.

The operation 502 consists of effecting the measurement of the degree of coherence of the septuple of pairs present in the register newdata and of placing in a register i, storing a variable i, the numeric value "1" and, in a register j, storing a variable j, the numeric value "0".

The operation 503 consists off effecting the combination @ of the septuple of pairs present in the register newdata and the $i^{th}$ operative word present in the read-only memory 23 and thus providing a new septuple of pairs, of which it may be noted that the second elements are identical to those of the septuple initially placed in the register newdata.

The new operation, referenced 504, consists of effecting the measurement of the degree of coherence of the resultant sequence provided by the operation 503.

The test 505 consists of testing whether j is equal to the number of operative words. If the result of the test 505 is negative, the test 508 is carried out and if the result of the test 505 is positive it is the operation 509 which is effected.

The test 506 consists of testing whether the measurement of the degree of coherence of the resultant sequence formed during the operation 503 is greater than the measurement of the degree of coherence of the septuple present in the register newdata.

If the test 506 is negative the central processing unit 21 effects the operation 507, which consists of incrementing the values i and j by 1 and returning to the operation 503. If the test 506 is positive the operation 508 consists of replacing the septuple present in the register newdata with the septuple of the resultant sequence arising from the operation 503 and returning the value j to the numeric value "0" and then returning to the operation 503.

If the test 505 is positive, the operation 509 gives the estimated transmitted code word by means of an inverse combination of the septuple present in the register receivedata with that present in the register newdata. The operation 510 consists of extracting the start- and end-of-message markers. The operation 511 consists of transferring the code word thus estimated to the register of the read-only memory 23 which contains the correlation table which is the inverse of the correlation table present in the read-only memory 13. The operation 512 consists of receiving from the read-only memory 23 the symbol represented by the code word. Finally, the operation 513 consists of transmitting the symbol in question to the output port 25 and returning to the operation 501.

The scope of the invention is not limited solely to the embodiments and variants depicted but on the contrary extends to the variants, improvements and modifications within the capability of persons skilled in the art.

According to another variant the demodulator 28 rounds the demodulated phases to the whole multiple of $\pi/4$ which is the nearest to the phase received.

According to another variant, each amplitude received is assumed to be equal to 1. According to this variant, it is possible to define a predetermined threshold and to halt the iterative calculation as soon as the replacement sequence exhibits a degree of coherence lower than this threshold. Let g be the minimum value of the degree of coherence of the code words different to the word [(0.1); (0.1); (0.1); (0.1); (0.1); (0.1); (0.1)]. The preferred value of the threshold is then equal to $$(g-n)/2 \tag{19}$$

It will be recalled that, in the example described and depicted above, n=7. According to this variant, iteration is halted either as soon as the threshold is crossed or when no new combination of the last replacement sequence with any operative word exhibits a degree of coherence lower than that of the said last replacement sequence.

Naturally the two variants described above can be used simultaneously. Furthermore, the implementation of the transmission error correction flow diagram corresponding to each of these variants poses no difficulties to persons skilled in the art and is therefore not disclosed here.

According to this variant, the measurement of the degree of coherence is preferentially the sum of the costs of the numbered elements of the septuple, in which the element i representing a phase receives the cost c(i) given by:

$$c(0)=0;\ c(1)=c(7)=1;\ c(2)=c(6)=2;\ c(3)=c(5)=3;\ c(4)=4; \tag{20}$$

According to another variant measurement of the degree of coherence:

$$c(0)=0;\ c(1)=c(7)=2\text{-square root of } 2;\ c(2)=c(6)=2;\ c(3)=c(5)=2+\text{square root of } 2;\ c(4)=4; \tag{21}$$

The implementation of the error correction flow diagram corresponding to these choices poses no difficulty to a person skilled in the art and is therefore not disclosed here.

I claim:

1. A method of transmitting series of information items, which utilizes:
    code words each comprising sequences of numbers, each of said numbers having one of at least three values, and some of the code words being operative words;
    this method comprising performing the following operations for each series of information items to be transmitted:
        said series of information items to be transmitted is represented by a series of code words, constituting a series for transmission, in accordance with a biunique correlation rule;
        a periodic signal is successively modulated by the numbers of the code words of the series for transmission and the signal thus modulated is transmitted;
        when this signal is received, it is demodulated into a series of received words, each formed from a sequence of numbers and representing a code word;
    wherein the following are additionally implemented:
        a function of combining two sequences, one of which is an operative word, thus providing a resultant sequence;
        a measurement whereby there is made to correspond to each sequence a real number representing the degree of coherence of the sequence;
    and wherein, for each word received:
        at least one sequence is calculated resulting from a combination of said received word and an operative word and
        said received word is replaced by said resultant sequence from the moment when the measurement of the degree of coherence of the latter indicates a coherence less than that of the received word, this resultant sequence being referred to as a "replacement sequence";
    and iteratively:
        at least one sequence is calculated resulting from the combination of the replacement sequence and an operative word, and
        the replacement sequence is replaced by said resultant sequence from the moment when the measurement of the degree of coherence of the latter indicates a coherence less than that of the preceding replacement sequence, this resultant sequence in turn being considered as the replacement sequence,
    this iterative calculation being repeated until no new combination of the last replacement sequence with any operative word exhibits a degree of coherence whose said measurement is less than that of said last replacement sequence, and said last replacement sequence then being considered as representing the difference between the word received and the code word which it represents.

2. A method for receiving messages modulating a periodic signal comprising, on reception of this signal, demodulating it into a series of received words, each formed from a sequence of numbers and representing a code word comprising a sequence of numbers, each number of said code word having one of at least three values, wherein the following are additionally implemented:
    a function of combining two sequences, one of which is an operative word selected from the code words, the said combination providing a resultant series, and
    a measurement whereby a real number, representing the degree of coherence of the sequence, is made to correspond to each sequence;
and wherein, for each word received:
    at least one sequence is calculated resulting from a combination of said received word and an operative word and
    said received word is replaced by said resultant sequence from the moment when the measurement of the degree of coherence of the latter indicates a coherence less than that of the received word, this resultant sequence being a replacement sequence;

and iteratively:

at least one sequence is calculated resulting from the combination of the replacement sequence and an operative word, and the replacement sequence is replaced by said resultant sequence from the moment when the measurement of the degree of coherence of the latter indicates a coherence less than that of the preceding replacement sequence, this resultant sequence in turn being considered as the replacement sequence, this iterative calculation being repeated until no new combination of the last replacement sequence with any operative word exhibits a degree of coherence whose said measurement is less than that of the last replacement sequence, and the last replacement sequence being then considered as representing the difference between the received word and the code word which it represents.

3. A message transmission method which utilizes:

code words comprising sequences of numbers, each of said numbers having one of at least three values;

some of the code words being operative words;

this method comprising performing the following operations for each series of information items to be transmitted:

the series of information items to be transmitted is represented by a series of code words constituting a series for transmission in accordance with a biunique correlation rule; and a periodic signal is successively modulated by the numbers of the code words of the series for transmission and the signal thus modulated is transmitted, wherein the code words are adapted so that the difference between the word received after demodulation of this signal and the code word which it represents corresponds to the last replacement sequence of a succession of steps implementing:

a function of combining two sequences, one of which is an operative word, the combination providing a resultant sequence, and a measurement whereby there is made to correspond to each sequence a real number representing the degree of coherence of the said sequence;

steps by means of which:

at least one sequence is calculated resulting from a combination of the received word and an operative word, and the received word is replaced by the resultant sequence from the moment when the measurement of the degree of coherence of the latter indicates a coherence less than that of the received word, this last resultant sequence being a replacement sequence;

and iteratively:

at least one sequence is calculated resulting from the combination of the replacement sequence and an operative word, and the replacement sequence is replaced by said resultant sequence from the moment when the measurement of the degree of coherence of the latter indicates a coherence less than that of the preceding replacement sequence, this last resultant sequence being in turn considered as the replacement sequence, this iterative calculation being repeated until no new combination of the last replacement sequence with any operative word exhibits a degree of coherence whose measurement is less than that of the last replacement sequence.

4. A method according to any one of claims 1 to 3, wherein the function of combining two sequences, one of which is an operative word, utilizes a predetermined number and provides a resultant sequence, each element of the resultant sequence being the addition, modulo said predetermined number, of the elements having the same rank in the combined sequences as said element of the resultant sequence.

5. A method according to any one of claims 1 to 3, wherein the phase of the periodic signal is modulated, the last replacement sequence then being considered as being equal to a sequence of phase differences between the signals corresponding to the received word and those corresponding to the transmitted code word which they represent.

6. A method according to any one of claim 1 to 3, wherein the code words form a closed set, all their combinations, by means of said combination function, being code words.

7. A method according to any one of claims 1 to 3, wherein the operative words are selected in such a way that the measurement of their degree of coherence is among the least significant of all the code words.

8. A method according to any one of claims 1 to 3, wherein the code words are selected in the form of sequences of numbers in which the circular shifts of the elements, which maintain their order modulo the number of elements, are also code words.

9. A method according to claim 8, wherein the operative words are selected in the form of sequences in which the circular shifts of the elements, which maintain their order modulo the number of elements, are also operative words.

10. A method according to any one of claims 1 to 3, wherein the code words are sequences of pairs formed from a modulus and an argument of a complex number, and wherein the combination function is the function which multiplies the moduli and adds the arguments.

11. A method according to any one of claims 1 to 3, wherein the code words are sequences of arguments of complex numbers and wherein the combination function adds the arguments.

12. A method according to any one of claims 1 to 3, wherein the code words are sequences of signal amplitude and phase pairs and the measurement of the degree of coherence of each sequence is the opposite of the sum of the products, for all the signal making up the said sequence, of the amplitude multiplied by the cosine of the phase.

13. A method according to any one of claims 1 to 3, wherein the iterative calculation is halted from the moment when the measurement of the degree of coherence of the last replacement sequence is below a threshold value.

14. A method according to any one of claims 1 to 3, wherein the correlation rules include a permanent correlation between the numbers of the series to be transmitted and the code words.

15. A device for receiving series of information items, comprising:

a means of demodulating received signals into a series of received words, each formed from a sequence of numbers and representing a code word formed from said sequence of numbers, each number of said code word having one of at least three values;

a random access memory which stores the series of received words;

a memory which stores operative words, each formed from a code word;

a first comparison random access memory which initially stores the first word in the series of received words;

a second comparison random access memory which initially stores an operative word;

a means for combining the words stored in the comparison random access memories, the combination providing a resultant word formed from a series of numbers;

a measurement means, whereby a real number, representing the degree of coherence of the sequence, is made to correspond to each received or combined word;

a comparison means for transmitting an item of information representing the word with the lowest degree of coherence between the word stored in the first comparison random access memory and the resultant word;

a replacement means which, if the word with the lowest coherence is the word stored in the first comparison random access memory, replaces this word with the combined word, and if not replaces the word stored in the second comparison random access memory with another operative word, the combination means, the measurement means, the comparison means and the replacement means being used iteratively until, for each word received, the degree of coherence of the word stored in the first comparison random access memory is less than the measurements of all the degrees of coherence of the combined words arising from the combination of this word and an operative word, and the last word stored in the first comparison random access memory then being considered as representing the difference between the received word and the code word which it represents.

16. A device according to claim 15, further comprising a means of comparing the measurement of the degree of coherence of the word stored in the first comparison random access memory on the one hand with a threshold value on the other hand, and wherein, when the first element is lower than the second, the word stored in the first comparison random access memory is considered as representing the difference between the received word and the code word which it represents.

17. A device according to either one of claims 15 or 16, wherein said means for combining the words stored in the comparison random access memories utilizes a predetermined number and provides the resultant sequence, each element of the resultant sequence being the addition, modulo said predetermined number, of the elements having the same rank in the combined sequences as said element of the resultant sequence.

18. A device for transmitting series of information items intended to be processed by a device for receiving series of numbers according to any one of claims 15 or 16, comprising:

a means of generating code words formed from sequence of numbers, each of said numbers having one of at least three values;

a means of correlating the series of information items to be transmitted with a series of code words constituting a series for transmission, according to a biunique correlation rule, which it supplies to the generation means;

a means of modulating a periodic signal by means of the numbers of the code words of the series for transmission coming from the generation means; and a means of transmitting the signal thus modulated.

19. A device according to claim 18, further comprising a correlation table which correlates on a permanent basis the numbers of the series to be transmitted with the code words.

* * * * *

UNITED STATES PATENT AND TRADEMARK OFFICE
CERTIFICATE OF CORRECTION

PATENT NO. : 5,867,508
DATED : February 2, 1999
INVENTOR(S) : PHILIPPE PIRET

It is certified that error appears in the above-indentified patent and that said Letters Patent is hereby corrected as shown below:

ON THE TITLE PAGE, ITEM

[57] ABSTRACT

Line 12, "received;" should read --received:--.
    Line 22, "sequence,;" should read --sequence;--.

COLUMN 1

Line 8, "applied" should read --applies--.

COLUMN 2

Line 16, "word" should read --word,--.
    Line 27, "word" should read -word,--.
    Line 33, "as" should read --as a--.
    Line 60, "word" should read --word,--.

COLUMN 3

Line 4, "word" should read --word,--.
    Line 10, "as" should read --as a--.
    Line 48, "word" should read --word,--.

UNITED STATES PATENT AND TRADEMARK OFFICE
CERTIFICATE OF CORRECTION

PATENT NO. : 5,867,508
DATED : February 2, 1999
INVENTOR(S) : PHILIPPE PIRET

It is certified that error appears in the above-indentified patent and that said Letters Patent is hereby corrected as shown below:

COLUMN 3 CONTINUED

Line 58, "word" should read --word,--.
Line 65, "as" should read --as a--.

COLUMN 5

Line 16, "a" (first occurrence) should be deleted.

COLUMN 6

Line 8, "terms" should read --items--.
Line 40, "errors;" should read --errors.--.

COLUMN 7

Line 12," timer T." should read --time T.--.
Line 33, "symbols $V_i$," should read --symbols $v_i$,--.
Line 67, "$s_i=V_i+e_i$" should read --$s_i=v_i+e_i$--.

UNITED STATES PATENT AND TRADEMARK OFFICE
CERTIFICATE OF CORRECTION

PATENT NO. : 5,867,508
DATED : February 2, 1999
INVENTOR(S) : PHILIPPE PIRET

It is certified that error appears in the above-indentified patent and that said Letters Patent is hereby corrected as shown below:

COLUMN 8

Line 13, "kin," should read --kind,--.
Line 25, "an" should read --and--; and "that" should read --those--.
Line 47, "$v$" (all occurrences) should read --v--.

COLUMN 9

Line 23, "$v$" (all occurrences) should read --v--.
Line 38, "$v$" (all occurrences) should read --v--.
Line 63, "$(v_i$" should read --$(v_i$--.

COLUMN 11

Line 31, "G=" should be deleted.
Line 52, "1.3;" should read --(1.3;--.

UNITED STATES PATENT AND TRADEMARK OFFICE
CERTIFICATE OF CORRECTION

PATENT NO. : 5,867,508

DATED : February 2, 1999

INVENTOR(S) : PHILIPPE PIRET

It is certified that error appears in the above-indentified patent and that said Letters Patent is hereby corrected as shown below:

COLUMN 12

```
Line 37, "[(6.1;" should read --[(6.1);--.
Line 47, "10)." should read --1).--.
Line 48, "16;" should read --16:--.
```

COLUMN 13

```
Line 63, "memory 222." should read --memory 22.--.
```

COLUMN 14

```
Line 24, "descibeed" should read --described--.
Line 47, "off" should read --of--.
Line 53, "new" should read --next--.
```

COLUMN 16

```
Line 23, "word" should read --word,--.
Line 63, "word" should read --word,--.
```

UNITED STATES PATENT AND TRADEMARK OFFICE
CERTIFICATE OF CORRECTION

PATENT NO. : 5,867,508
DATED : February 2, 1999
INVENTOR(S) : PHILIPPE PIRET

It is certified that error appears in the above-indentified patent and that said Letters Patent is hereby corrected as shown below:

COLUMN 18

Line 14, "claim 1" should read --claims 1--.
   Line 42, "signal" should read --signals--.

COLUMN 20

Line 17, "sequence" should read --sequences--.

Signed and Sealed this

Twenty-third Day of November, 1999

Attest:

Q. TODD DICKINSON

Attesting Officer

Acting Commissioner of Patents and Trademarks